March 24, 1936.    R. JARDINE    2,035,165
VALVE SEAT RING AND METHOD OF SECURING SAME
Filed April 16, 1934    2 Sheets-Sheet 2

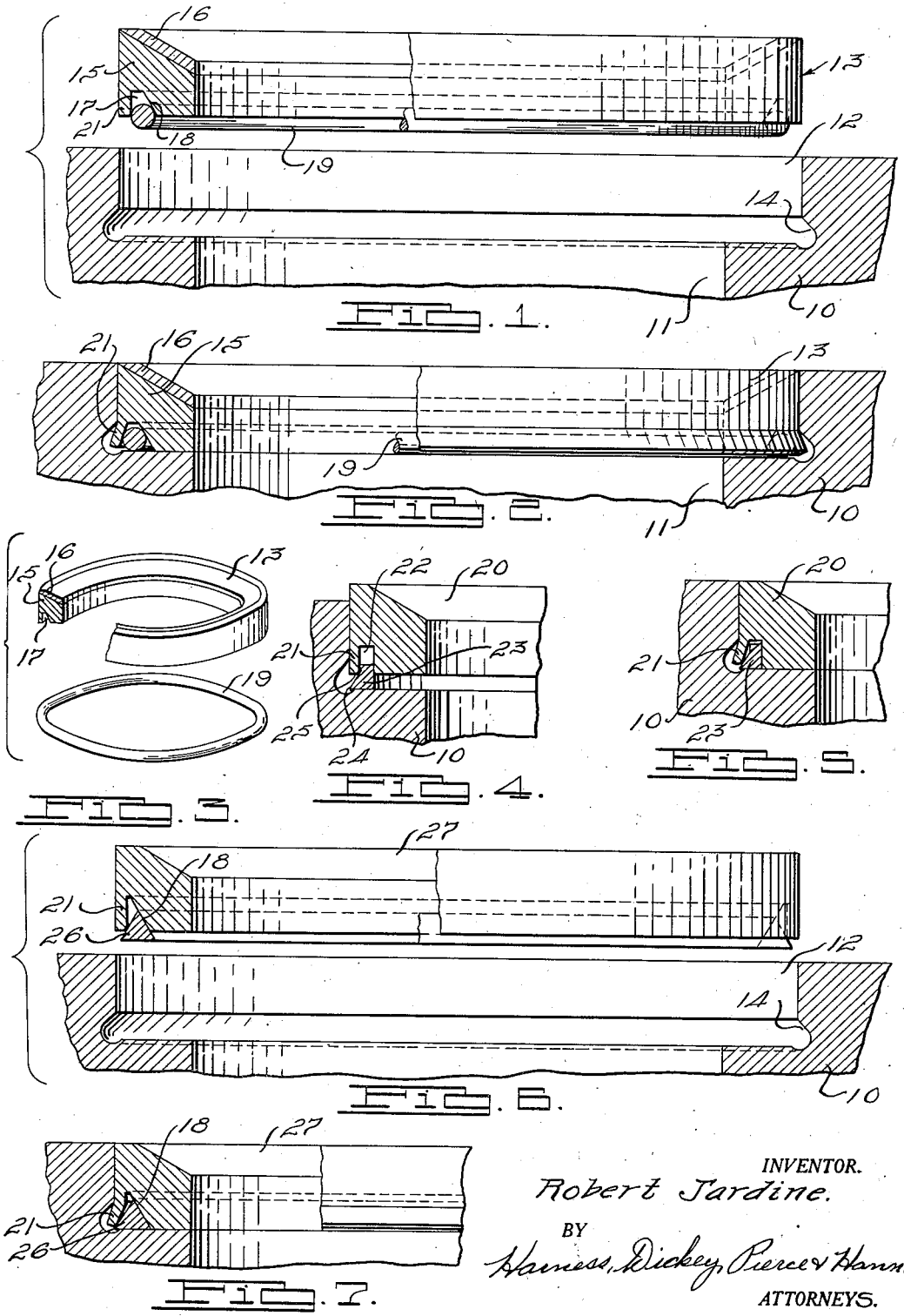

INVENTOR.
Robert Jardine.
BY
Harness, Dickey, Pierce & Hann.
ATTORNEYS.

Patented Mar. 24, 1936

2,035,165

UNITED STATES PATENT OFFICE 2,035,165

VALVE SEAT RING AND METHOD OF SECURING SAME

Robert Jardine, Detroit, Mich., assignor to Wilcox-Rich Corporation, a corporation of Michigan Application April 16, 1934, Serial No. 720,707

8 Claims. (Cl. 123—188)

My invention relates to valve seat rings and particularly to a valve seat ring and the method and means for securing the ring in a seat disposed about the valve port in an engine block.

Heretofore difficulty has been experienced in securing a valve seat ring in a seat in an engine block due primarily to the changes in temperature to which the rings are subjected. Owing to the different materials in the block and the ring a differential of expansion will occur which, in the presence of the high temperature changes, causes the ring to become loose in the seat. Various means have been provided heretofore, such as brazing or welding the ring in the seat, or peening over the material of the block to retain the seat in firm, fixed relation, all of which were either impractical, expensive or commercially lacking in utility.

In practicing the present invention I provide simple means whereby the ring may be inserted in the recess portion at the end of the valve port in an engine block and be secured therein in firm, fixed relation. The ring is retained in such manner that the expansion and contraction of the material cannot affect the fixed relation of the ring and there is no possibility of the ring becoming loose, broken or moved from its seat. I accomplish this by providing a slot about the lower outer edge of the valve seat ring adjacent to which an expanding member is disposed. This member forces the skirt formed by the slot in the ring, outwardly into an undercut portion provided at the bottom of the seat to thereby permanently lock the ring in position. The expanding member may be split so as to permit it to be extended when moving outwardly to cause the skirt to be deflected, or the ring may be solid and have its inner wall parallel to the side of the recess and having the outer portion sloping to cause the skirt to be deflected outwardly when the ring is disposed in its seat. The expanding means may be part of the engine block, thereby eliminating the separate expanding member.

Accordingly, the main objects of my invention are to provide a depending skirt on the lower outer portion of the valve seat ring which may be deflected outwardly, when seated, into an undercut portion adjacent to the seat; to provide a sloping surface adjacent the depending skirt with which an annular element is mated to be expanded when the seat is driven home to cause the skirt to be deflected into an undercut portion of the ring; to provide a solid ring having an inner wall vertically disposed and an outer sloping wall in engagement with the skirt to have the sloping wall cause the expansion of the skirt when the valve seat ring is driven onto its seat; to provide a ridge within the recess disposed about the valve opening adjacent to an undercut portion thereof to engage the depending skirt at the outer lower portion of the valve seat ring to cause the skirt to be deflected outwardly into the undercut portion and thereby lock the ring firmly in its seat; and, in general, to provide a valve seat ring with locking means relative to its seat about a port of an engine block which is positive in operation, which securely retains the ring in its seat, and which is economic of manufacture.

Other objects and features of novelty of my invention will be either specifically pointed out or will become apparent when referring, for a better understanding of my invention, to the following description taken in conjunction with the accompanying drawings, wherein:

Figure 1 is a sectional view of a shouldered seat and a valve seat ring in separated relation and embodying features of my invention, Fig. 2 is a view of structure similar to Fig. 1 when the ring is disposed in its seat, Fig. 3 is a broken perspective view of the ring and skirt expanding member illustrated in Fig. 1;

Fig. 4 is a sectional view of structure, similar to that illustrated in Fig. 1, showing a modified form thereof;

Fig. 5 is a view of the structure illustrated in Fig. 4, showing the valve seat ring in seated position;

Fig. 6 is a view of structure, similar to that illustrated in Fig. 1, showing a further modified form thereof, Fig. 7 is a view of the structure illustrated in Fig. 6, showing the ring in seated position.

Figure 8:
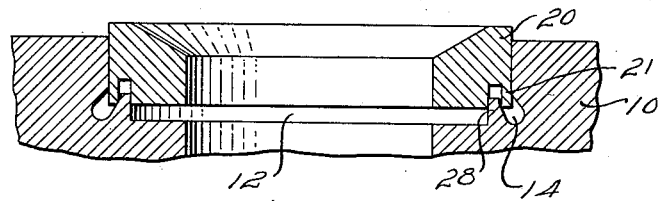
Fig. 8 is a view of structure, similar to that illustrated in Fig. 4, showing a modified form thereof.

Referring to Fig. 1, I have illustrated an engine block 10 having an exhaust port 11 therein which is counterbored at 12 to provide a seat for a valve seat ring 13. The counterbore portion 12 is undercut at 14 to form a recess for an expandible skirt on the ring 13 which securely locks the ring in its seat. The ring 13 comprises a body portion 15 preferably made of cast iron or of a metal similar in expansion to that of which the engine block 10 is made. I have illustrated a valve engaging portion 16 for the ring made of heat resisting material which may be of stellite, tungsten, manganese, vanadium, molybdenum or like well known heat resisting metal or alloys thereof.

An annular recess 17 is provided on the lower face of ring 13, the outer surface of the recess is parallel to the outer surface of the ring while the inner surface is sloping, as at 18. An annular ring 19 having a cross section greater in dimension than the width of the slot 17 is disposed adjacent to the bottom of the slot in a position to be expanded when moved along the sloping surface 18, to force the depending skirt portion 21 outwardly to within the undercut portion 14 of the seat in the engine block 10. This is illustrated in Fig. 2 wherein through the driving of the element 11 firmly within the counterbore 12 the downward movement of the element relative to the annular ring 19, causes the ring 19 to expand and force the skirt 21 outwardly into the recess 14. In this manner, the ring is securely locked in the seat and if it becomes loosened due to the difference of expansion, it cannot move within the seat in view of its locked relation therein. The valve seat ring 13 and the expanding member 19 are illustrated in perspective in Fig. 3. It will be noted that the ring 19 is preferably split so as to permit it to expand when moving relative to the sloping side 18 of the ring 13.

Referring to Figs. 4 and 5, I have illustrated another form of my invention wherein a slot 22 is cut adjacent to the outer surface of the ring to provide the depending skirt 21. A complete ring 23 of trapezoidal section has its inner surface parallel to the inner surface of the slot 22 and effects the expansion of the skirt portion 21 through the movement of the skirt portion along the outer sloping surface 24 of the expanding element 23. The corner 25 of the skirt 21 is preferably rounded so as to readily slide over the sloping surface 24 of the element 23. In Fig. 5 I have illustrated the ring 20, locked in its seat. The material of the ring 20 forms the valve seat, eliminating the surfacing metal 16 employed in the ring 13 of Fig. 1. However, in either instance the materials may be interchanged and the element 16 may be omitted from the structure illustrated in Figs. 1 and 2 and may be added to that illustrated in Figs. 4 and 5. It will be noted in Fig. 5, that the skirt 21 has been expanded to within the recess 14 to thereby lock the ring securely in its seat.

In Figs. 6 and 7, I have shown a further modified form wherein a triangular shaped annular element 26 is employed mated with a sloping side 18 of a ring 27 having a skirt portion 21 engaging the other sloping side thereof, the element 25 is preferably split so as to be readily expansible when moving relative to the sloping side 18 to force the skirt 21 outwardly to within the recess 14, as illustrated in Fig. 7.

It is to be understood that various shapes of slots and skirts as well as the expanding members may be utilized in combination with the material or materials employed in the valve seat ring, to cause the expansion of the skirt 21 thereof into the recess at the base of the seat in the engine block to thereby lock the ring securely in place.

Various forms have been illustrated in the drawings, including circular, triangular, trapezoidal sections. It will be apparent to those skilled in the art that various other cross sections and shapes of the expanding members and slots may be utilized in combination with each other for effecting the expansion of the skirt portion of the ring.

Figure 9:
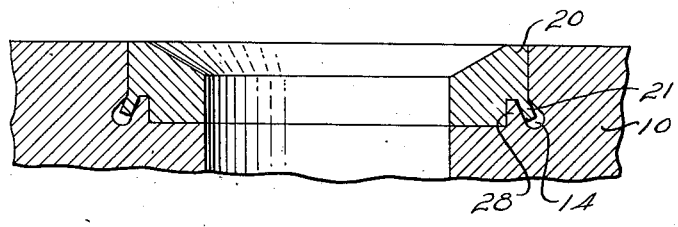
Fig. 9 is a view of the structure illustrated in Fig. 8, with the seat ring in clamped position.

It is to be understood that it is within the purview of my invention to provide an extending portion the shape of the element 23 on the seat of the engine block to engage the skirt 21 of the ring to force the skirt to be deflected within the recess of the counterbored portion. I have shown such construction in Figs. 8, 9, 10 and 11. An upwardly extending ring portion 28 is the same as the ring 23 in Figs. 4 and 5 with the exception that it forms part of the cylinder casting 10. The ring insert 20 is the same as the ring in Figs. 4 and 5, which, when forced down into the recess 12, has the depending skirt 21 thereof expanded into the recess 14 to form a lock with the cylinder casting 10 to be secured therein as clearly shown in Fig. 9.

Figure 10:
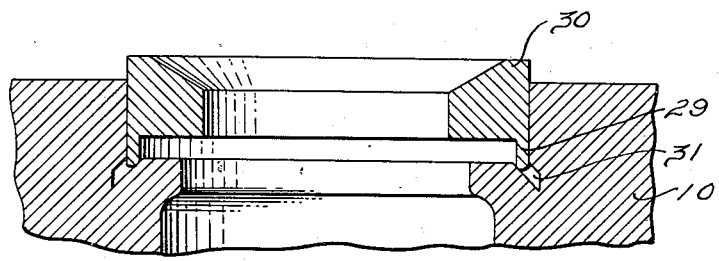
Fig. 10 is a view of structure, similar to that of Fig. 8, showing a modified form thereof.
Figure 11:
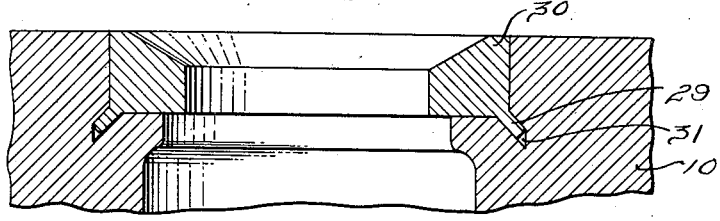
Fig. 11 is a view of the structure illustrated in Fig. 10, with the seat ring in clamped position.

In Figs. 10 and 11 the same form of construction is shown with the exception that a skirt 29 extends downwardly from the ring insert 30 to be forced into a slot 31 to anchor the ring insert 30 therein, as clearly illustrated in Fig. 11. In this manner, the rings, such as 19, 23, 26 hereinabove referred to, may form a portion of the cylinder casting and cause the skirt of the valve seat ring to be expanded into locking engagement with the cylinder wall.

I have illustrated the skirt as being continuous but it is to be understood that it is also within the purview of my invention to divide the skirt into several portions so as to have it more readily deflected. However, in the preferred form of my invention I desire to retain the skirt entire and expand the material thereof to provide a stronger locking engagement. However, in certain forms of the depending skirt it may be desirable to split the skirt into a plurality of arcuate portions rather than a continuous annular portion to more readily effect its deflection into the recess.

While I have described and illustrated several embodiments of my invention, it will be apparent to those skilled in the art that various changes, omissions, additions and substitutions may be made therein without departing from the spirit and scope of my invention as set forth in the accompanying claims.

I claim as my invention:

1. In combination with an engine block having an undercut counterbored portion adjacent to a valve port, a valve seat ring having the underside thereof slotted to provide a depending skirt, and an expanding element adjacent to said slot for causing the skirt to be expanded into the undercut when the ring is seated in said counterbored portion to prevent the outward movement of the ring.

2. In combination with an exhaust port of an engine block having a counterbore which is undercut, a valve seat ring having a slot in its lower face forming a depending skirt, an expanding member disposed adjacent to said skirt, said ring having a sloping surface in engagement with said member to cause the member and skirt to be expanded toward the undercut portion when the ring is seated in said counterbore to lock the ring into the engine block.

3. In combination with an engine block having an exhaust port which is counterbored, the counterbore being undercut at the bottom, a valve seat ring having a slot in its under face forming a depending annular skirt about the edge thereof, and an annular element for effecting expansion of said skirt into said recess when the valve ring is seated in said counterbore.

4. In combination with an engine block having a counterbored portion about the top of the valve port, the said portion being undercut at the bottom, a valve seat ring having a slot in the underside thereof forming a depending skirt at the outer lower end of said ring, and means for causing the depending skirt portion of the ring to be deflected into said undercut at the bottom of the counterbore for locking the ring when seated.

5. An engine block having a valve port with a shouldered recess provided adjacent to the sealing valve for said port, a valve seat ring seatable in said shouldered recess, the shouldered recess of said valve port being further recessed, anchoring means on said ring engageable with said further recess, and means serving to lock said ring in said shouldered recess.

6. An engine block having a valve port with a shouldered recess provided adjacent the sealing valve thereof, a valve seat ring seatable in said shouldered recess to be sealed by said valve, the shouldered recess of said valve port being further recessed, anchoring means on said ring, and means for expanding said anchoring means to lock said ring in said shouldered recess.

7. An engine block having a valve port with a shouldered recess provided adjacent the sealing valve for said port, the shouldered recess of said valve port being further recessed to provide a sloping undercut portion, a valve seat ring seatable in said shouldered recess, said valve seat ring having a skirt which, prior to insertion is of the same outside diameter as valve seat ring and which, after insertion has a diameter greater than the outside diameter of said valve ring, the walls of said further recess serving to expand said skirt and anchor said ring within said shouldered recess.

8. An engine block having a valve port with a shouldered recess provided adjacent the sealing valve for said port, a valve seat ring seatable in said shouldered recess, said valve seat ring having a skirt which prior to the insertion of said valve seat ring in said recess is of substantially the same diameter as the body of said valve seat ring, the shouldered recess of said valve port being further recessed to provide an undercut portion having sloping walls whereby upon insertion of said valve ring the skirt thereof will be expanded into said undercut portion to anchor said ring in said shouldered recess.

ROBERT JARDINE.